United States Patent
Hu et al.

(10) Patent No.: US 8,396,296 B2
(45) Date of Patent: Mar. 12, 2013

(54) BRAND IMAGE DETECTION

(75) Inventors: Wei Hu, Beijing (CN); Jinqiao Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 1223 days.

(21) Appl. No.: 11/967,908

(22) Filed: Dec. 31, 2007

(65) Prior Publication Data

US 2009/0169115 A1 Jul. 2, 2009

(51) Int. Cl.
*G06K 9/40* (2006.01)
*H04N 5/272* (2006.01)
*G06T 1/00* (2006.01)

(52) U.S. Cl. .................. 382/199; 382/275; 348/E5.058; 345/522

(58) Field of Classification Search .................. 382/199, 382/275, 107, 254, 100; 348/587, E9.056, 348/E5.058, E7.069, E5.066; 345/634, 522, 345/640, 473, 422, 589; 358/296, 518
See application file for complete search history.

(56) References Cited

U.S. PATENT DOCUMENTS

| | | | | |
|---|---|---|---|---|
| 5,638,465 A * | 6/1997 | Sano et al. | .................... | 382/281 |
| 5,751,850 A * | 5/1998 | Rindtorff | ..................... | 382/178 |
| 7,206,000 B2 * | 4/2007 | Zitnick et al. | ................. | 345/592 |
| 7,215,384 B2 * | 5/2007 | McVeigh et al. | ............. | 348/699 |
| 7,509,665 B2 * | 3/2009 | Takagi et al. | ................... | 725/72 |
| 7,720,283 B2 * | 5/2010 | Sun et al. | ....................... | 382/173 |
| 8,107,540 B2 * | 1/2012 | Mohandas | ............... | 375/240.26 |
| 2007/0160123 A1 * | 7/2007 | Gillespie | ....................... | 375/222 |
| 2007/0183661 A1 * | 8/2007 | El-Maleh et al. | ............. | 382/173 |
| 2007/0216675 A1 * | 9/2007 | Sun et al. | ....................... | 345/419 |
| 2008/0152236 A1 * | 6/2008 | Vendrig et al. | ................ | 382/224 |

OTHER PUBLICATIONS

Canny, John "A Computational Approach to Edge Detection", IEEE Trans. PAMI 8(6), 1986, 20 Pages.
Geraets, W.G.M. et al., "An efficient filling algorithm for counting regions", Computer Methods and Programs in Biomedicine, 2004, 11 Pages.
Mizutani, Massami et al., "Commercial Detection in Heterogeneous Video Streams Using Fused Multi-Modal and Temporal Features", Proc. ICASSP '05, Philadelphia, 2005, 21 Pages.
Wikipedia, "OpenCV", http://en.wikipedia.org/wiki/OpenCV, last referenced Mar. 12, 2012, 3 Pages.

* cited by examiner

*Primary Examiner* — Sheela Chawan
(74) *Attorney, Agent, or Firm* — Blakely, Sokoloff, Taylor & Zafman, LLP

(57) ABSTRACT

A method comprises segmenting a foreground and a background of an image; and extracting one or more features from the foreground and the background to recognize a brand image. The features comprises one or more from a group comprising a foreground area, coordinates of a foreground centroid, a foreground symmetry, a connected property, a spatial moment of the foreground, a normalized center moment of the foreground, a background area, variations of the background in red, green and blue color channels, a ratio of the foreground area and the background, an entropy of the image, an edge density of the image.

18 Claims, 3 Drawing Sheets

BRAND IMAGE DETECTION

BACKGROUND

Broadcast videos may comprise one or more images or frames that comprises commercial information, including, e.g., a logo, a product, a brand, a company, a service mark, an idea or any other commercial features. In some broadcast systems, a rule based commercial feature (e.g., a black frame or a monochrome frame) may be inserted into a broadcast stream to separate a commercial spot from other program. The broadcast stream may further comprise a silence that is associated with the black frames or monochrome frames. In some television systems, commercials may occur without a television network logo while in some other television systems, the rule based commercial feature may be absent.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
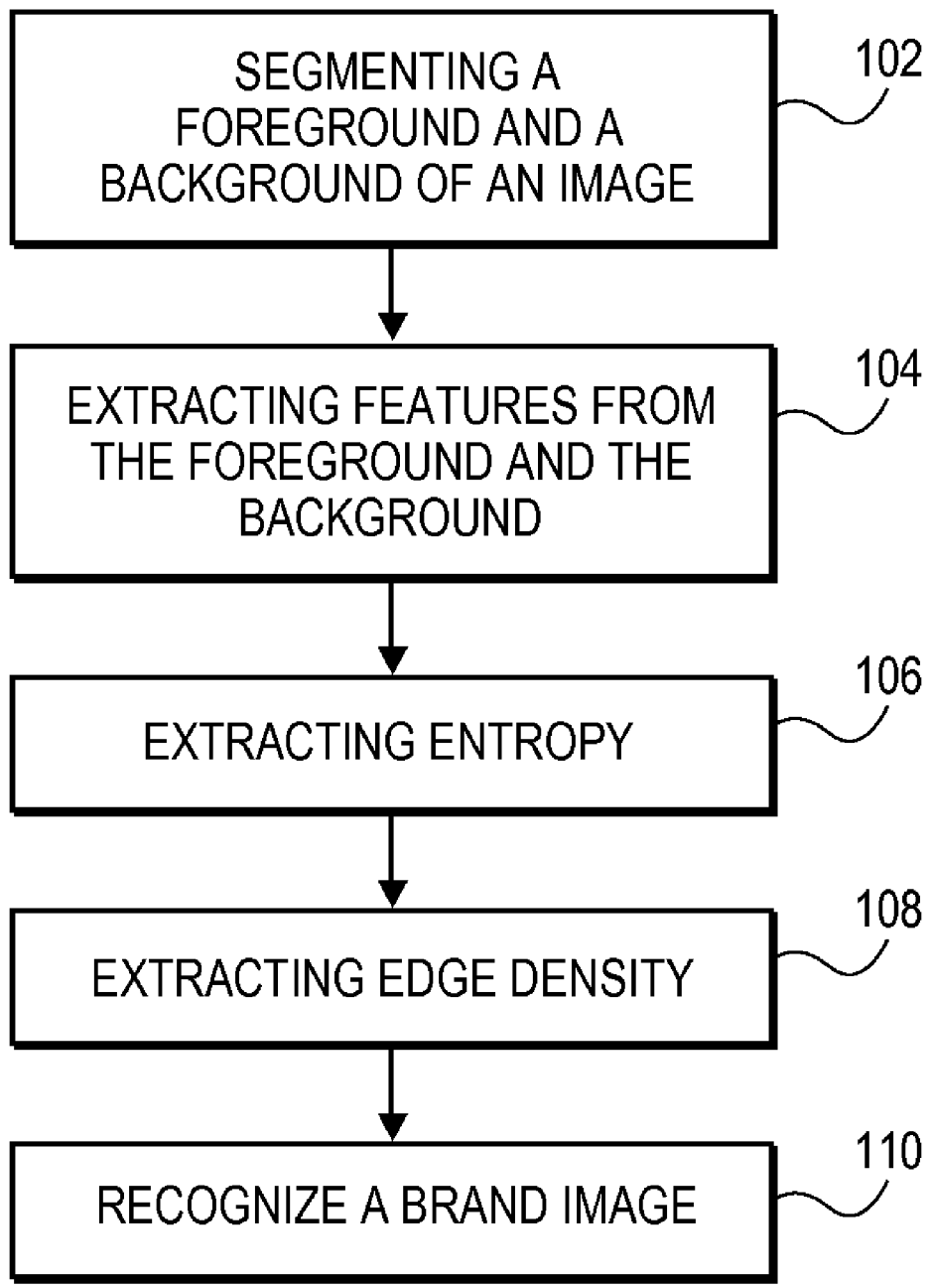
FIG. 1 is a schematic diagram of an embodiment of a method that may be used to detect a brand image in, e.g., a broadcast video stream.

The following description describes techniques to provide a method that may be used to detect a brand image in, e.g., a video stream. The implementation of the techniques is not restricted in computing systems; it may be used by any execution environments for similar purposes, such as, for example, other digital/electronic equipment.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In one embodiment, a brand image may refer to a content based semantic visual concept, e.g., an image or a frame that may have a background and a foreground. For example, the background and the foreground may have different complexity; however, in some embodiments, this may not be required. In another embodiment, a brand image may comprise commercial information and/or brand information, including, e.g., a logo, a product, a brand, a company, a service mark, an idea or any other commercial features. In another embodiment, a brand image may indicate a commercial video or a commercial break. In some embodiments, in a brand image, a foreground may have a smaller area than a background and may locate in proximity to a center of the brand image. In yet another embodiment, a brand image may comprise a foreground that may comprise textual information; however, in some embodiment, a textual foreground may not be required.

Figure 2:
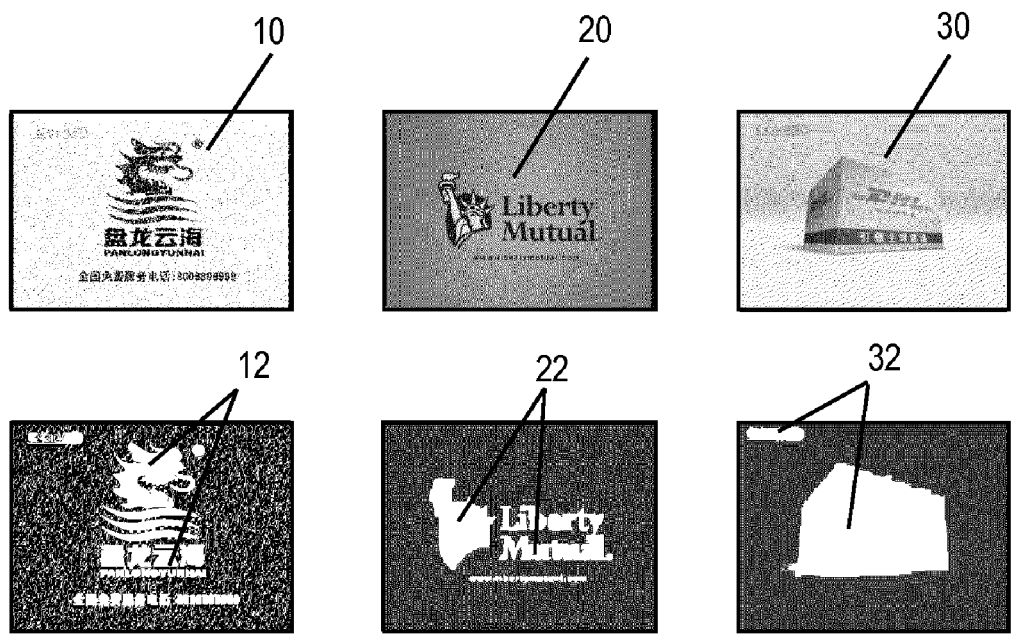
FIG. 2 is a schematic diagram that may correspond to an embodiment of brand images.

FIG. 1 illustrates an example embodiment of a method that may be used to detect a brand image in, e.g., a broadcast video stream. In one embodiment, an image may be obtained on a shot level; however, some embodiments may capture an image in a different manner, e.g., on a frame level. An image may comprise a frame of a shot. One or more statistical features may be extracted for an image to be detected. In one embodiment, images to be detected may be normalized to the same size. For example, FIG. 2 illustrates an embodiment of a first image 10, a second image 20 and a third image 30 that may be normalized to the same size.

Referring to FIG. 1, some embodiment of the method may comprise to segment an image into a background and a foreground (block 102). In one embodiment, a background and/or a foreground may comprise one or more parts that may each comprise one or more pixels. In one embodiment, an algorithm (e.g., canny edge detector) may be utilized to obtain one or more contours of an image to provide an edge image, which may be used to provide a foreground and a background. In another embodiment, one or more local bounding rectangles may be calculated from the edge image. In one embodiment, an algorithm (e.g., Floodfill algorithm) may be applied to the local bounding rectangles to distinguish the foreground and the background; however, the algorithm may not be required. For example, FIG. 2 illustrates an embodiment of a first foreground 12 corresponding to a first image 10, a second foreground 22 corresponding to a second image 20 and a third foreground 32 corresponding to the third image 30.

Referring to FIG. 1, some embodiments may further involve extracting one or more statistical features of the foreground and background of an image (block 104). In one embodiment, a brand image may comprise a foreground (e.g., comprising logo, brand or product information) at a center position of the image; however, in some embodiments, this may not be required. at the center position. One embodiment may extract an area of the foreground, e.g., a number of pixels in the foreground (e.g., one dimension). In another embodiment, a foreground of a brand image may be symmetric and may comprise one or more parts that may be connected or adjacent to each other; however, this may not be required. Some embodiments may extract from the foreground coordinates of a foreground centroid (e.g., two dimensions). Some embodiments may further involve extracting foreground symmetry (e.g., one dimension), connected property (e.g., 2 dimensions), a spatial moment (e.g., 2 dimensions) and/or a normalized center moment (e.g., 5 dimensions). In one embodiment, the pixels in the foreground may be combined to provide one or more parts that may each comprise pixels that are connected, or adjacent pixels and/or with pixel distance smaller than a threshold. the foreground symmetry may be calculated from a coordinate of the image center between a left part and a right part in the foreground (e.g., in x direction). Some embodiments may involve calculating a sum of distances between respective centroid of each part of the foreground (in x and y directions, respectively) to provide the connected property.

Some embodiments may involve extracting an area of the background (e.g., 1 dimension), respective color variations in the background for R (red), G (green) and B (blue) color channels (e.g., 3 dimensions). In another embodiment, a ratio of the foreground area and the background area may be extracted.

Referring to FIG. 1, some embodiments may further involve extracting an entropy of an image and/or a image grid (block 106). In one embodiment, a brand image may have higher complexity and/or edge density in a center portion than in the surroundings; however, in some embodiments, a brand image may have a center portion with a lower complexity and/or a lower edge density. For example, the entropy may reflect a complexity of an image. In one embodiment, some embodiments may transform a colored image to a grey-level image; however, the transformation may not be required. Some embodiments may further involve combine intensity values or grey levels of an image (e.g., 0~255) to provide a smaller number of intensity levels or grey level bins (e.g., 32 bins) by a scaler or a vector quantization method to reduce a noise in the obtained entropy.

In one embodiment, a global entropy and/or one or more local entropies of the image may be calculated. The global entropy may correspond to a global property of pixel distribution in the image. The following first equation (1) may be use to calculate a global entropy of an image I:

$$\mathrm{Entropy}(I) = -\sum_{i=0}^{31} h(i)\log(h(i)) \quad (1)$$

where h may represent a gray level histogram of an image I. For example, a number of pixels in an $i^{th}$ grey level bin may be divided by a total number of pixels in the image I to provide h(i). In one embodiment, a global entropy of a brand image may below, e.g., around 5.0 while a global entropy for non-brand images may be greater than, e.g., around 5.0; however, a different entropy may be obtained.

In another embodiment, the image I may be equally divided into 3×3 grids. A local entropy may further be calculated for each image grid. A local entropy may correspond to a spatial property of pixel distribution in an image grid. The local entropy of an image grid may be calculated based on the first equation (1). The entropy features of an image may be 10 dimensions. Similarly, some embodiments may involve obtain a global entropy and one or more local entropies of a colored image for R, G, B colors, respectively, e.g., based on equation (1).

Figure 3:
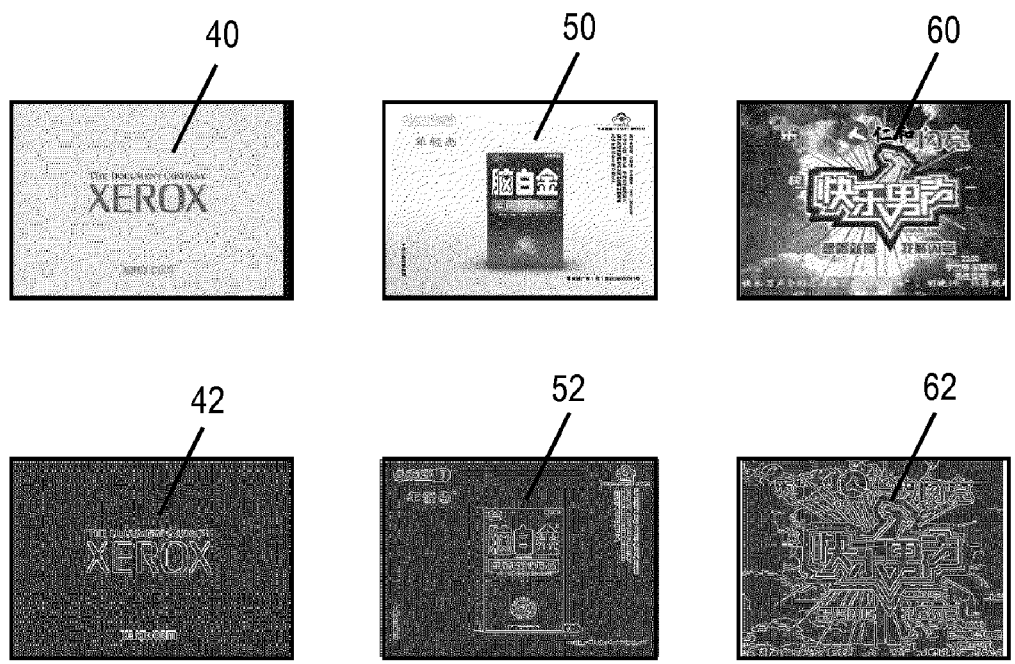
FIG. 3 is a schematic diagram that may correspond to an embodiment of brand images.

In one embodiment, a brand image may comprise edges with more complexity and intensity at, e.g., a center of the brand image. Referring to FIG. 3, it is illustrated an embodiment of brand images 40, 50 and 60. Some embodiments may involve extracting spatial distribution features of edge pixels in an image (e.g., image 60 of FIG. 3). An algorithm (e.g., Gaussian filter) may be used to filter the image. An edge obtaining algorithm (e.g., canny edge detector) may be used to obtain an edge image (e.g., edge images 42, 52 and 62 of FIG. 3).

Referring again to FIG. 1, some embodiments may extract edge density including a global edge density and a local edge density of an edge image (block 108). The edge image may be divided into 3×3 grids. A local edge density in each image grid may be calculated as follows:

$$EdgeDensity_i = \begin{cases} 2E_i/N & \text{if } 2E_i < N \\ 1 & \text{else} \end{cases} \quad (2)$$

where i may represent an image grid i, and $E_i$ may represent a number of canny edge pixels in the image grid i, N may represent a total number of pixels in the image grid i. The global edge density may be calculated similarly based on equation (2) for the whole edge image, wherein i may refer to the edge image, $E_i$ may refer to a number of canny edge pixels in the edge image, and N may represent a total number of pixels in the edge image. The edge features may have 10 dimensions.

Referring again to FIG. 1, some embodiments may involve recognizing a brand image and/or detecting a commercial break in a broadcast video stream, e.g., by a support vector machine (SVM) classifier (block 110). Some embodiments may involve training the SVM classifier with a plurality of brand images and non-brand images obtained from a broadcast video stream. In one embodiment, the SVM classifier may utilize the one or more image features as described above to recognize a brand image. While the flow of FIG. 1 is illustrated as a sequence of operations, in some embodiments, the illustrated operations of the flow may be performed in a different order.

Figure 4:
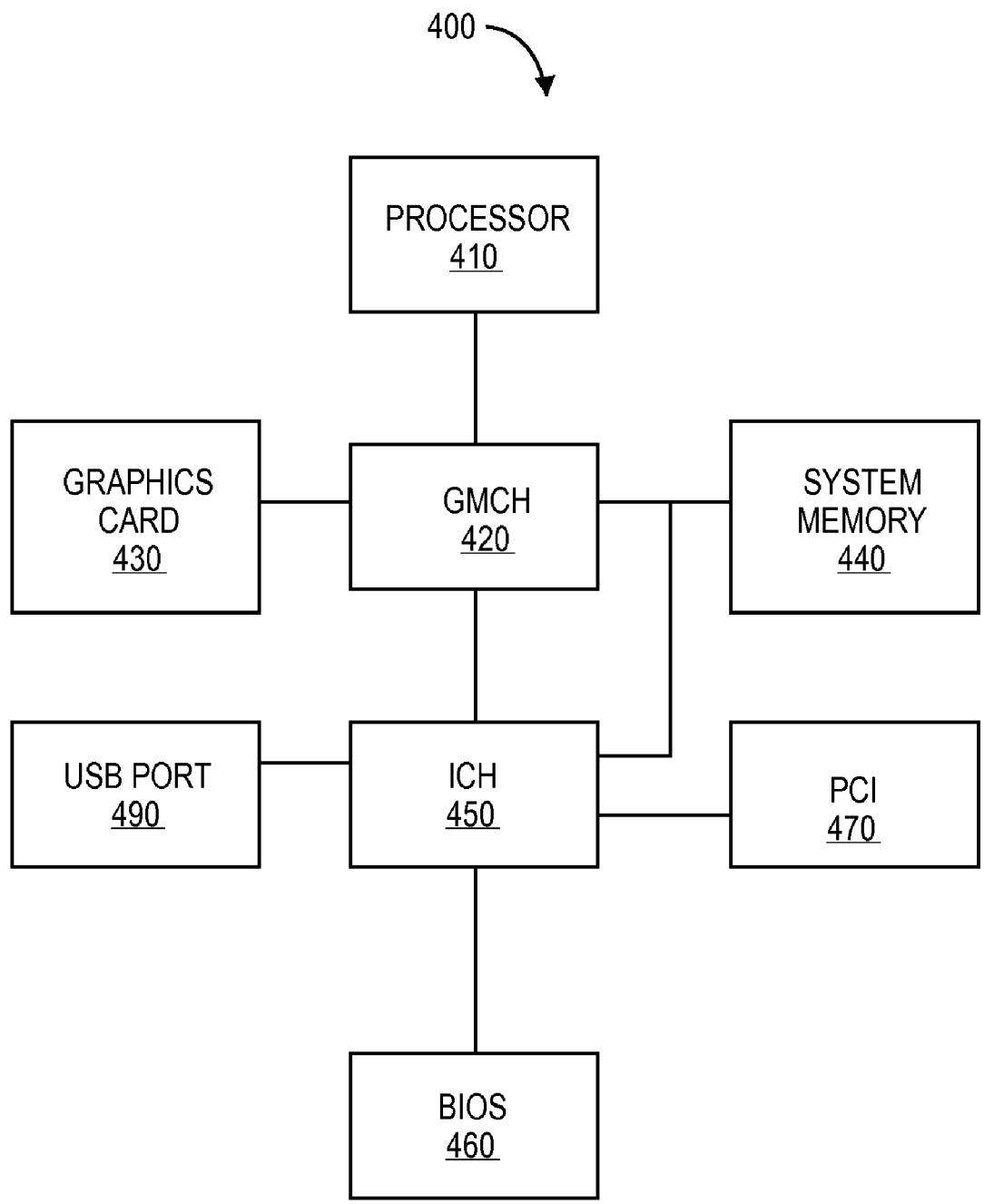
FIG. 4 is a schematic diagram of a processor based system.

FIG. 4 illustrates a block diagram of an exemplary embodiment of an electronic system that may comprise a processor based system that may correspond to an example of a desktop board 400, also referred to as a motherboard. The desktop board 400 may comprise a processor 410 that may be coupled to a graphics and memory controlled hub (GMCH) 420. GMCH 420 may be coupled to an I/O controller hub (ICH) 550. The GMCH 420 may support access to a system memory 440 and a graphics card 430. For example, the system memory 440 may comprise DDR and/or dual in line memory (DIMM), or any other memory.

The ICH 450 may couple to basic I/O system (BIOS) 460 that may be stored in non-volatile memory (e.g., a flash memory, a firmware hub, etc.). In one embodiment, the BIOS 460 may provide instructions and operations to initialize the desktop board 100. The ICH 450 may support, e.g., an system memory bus (SMBus), a low pin count (LPC) or serial peripheral interface (SPI) that may be coupled to the BIOS 460, a PCI bus (coupled to one or more PCI slots 470), and one or more USB ports 490.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A method comprising:
   segmenting a foreground and a background of an image that comprises a plurality of image grids;
   extracting a global entropy of the image based on a grey level histogram of the image;
   extracting a local entropy for each image grid based on a grey level histogram of the image grid; and
   recognize the image based on the global entropy and the local entropies.

2. The method of claim 1, comprising:
   detecting a contour of the image to provide an edge image from the image; and
   extracting a global edge density of the edge image based on a number of canny edge pixels in the image and a total number of pixels in the image.

3. The method of claim 2, comprising:
   applying a Floodfill algorithm on a local bounding rectangle calculated in the edge image to segment the foregaround and the background.

4. The method of claim 1, comprising:
   extracting one or more features from the foreground and the background, wherein the features comprises one from a group comprising a foreground area, coordinates of a foreground centeroid, a foreground symmetry, a connected property, a spatial moment of the foreground, a normalized center moment of the foreground, a background area, variations of the background in red, green and blue color channels, a ratio of the foreground area and the background, an entropy of the image, an edge density of the image.

5. The method of claim 4, comprising:
   recognizing the image by a support vector machine classifier.

6. The method of claim 1, comprising:
   scaling the grey levels of the image to provide a plurality of grey level bins;
   dividing the number of pixels in each grey level bin by a total number of pixels in the image to provide the global entropy of the image.

7. The method of claim 1, comprising:
   extracting a global edge density of the image based on a number of canny edge pixels in the image and a total number of pixels in the image; and
   extracting a local edge density of each image grid based on a number of canny edge pixels in the image grid and a total number of pixels in the image grid.

8. A system comprising:
   a memory;
   a processor that couples to the memory, the processor to obtain an edge image from an image, extract a global entropy of the image based on a gray level histogram of the image, extract a global edge density of the edge image based on a number of canny edge pixels in the image and a total number of pixels in the image and recognize the image based on the the global entropy of the image and the global edge density of the edge image.

9. The system of claim 8 wherein the processor further to segment a foreground and a background of the image and extract one or more features from the foreground and the background to recognize the image.

10. The system of claim 8 wherein the processor further to extract a feature from a foreground and a background of the image, the feature comprises one from a group comprising a foreground area, coordinates of a foreground centeroid, a foreground symmetry, a connected property, a spatial moment of the foreground, a normalized center moment of the foreground, a background area, variations of the background in red, green and blue color channels, a ratio of the foreground area and the background.

11. The system of claim 8 wherein the processor further to equally the image into a plurality of image grids, obtaining a local entropy of each image grid in the image, and recognize the image further based on the local entropy of each image grids.

12. The system of claim 8 wherein the processor further to extract a global edge density of the edge image and a local edge density of an image grid in the edge image.

13. The system of claim 8 wherein the processor further to execute a canny edge detector to obtain the edge image.

14. The system of claim 8 wherein the processor to execute a support vector machine classifier to recognize the image.

15. A non-transitory tangible machine readable medium comprising a plurality of instructions that in response to being executed result in a computing device
   extracting a global entropy of an image based on a grey level histogram of the image to obtain texture distribution of the image;
   extracting a local entropy of each image grid comprised in the image based on a grey level histogram of the image grid; and
   recognizing a commercial break in a video stream based on the global entropy and the local entropies.

16. The tangible machine readable medium of claim 15, wherein the machine readable medium further comprising instructions that in response to being executed result in the computing device
   segmenting a foreground and a background of the image; and
   extracting one or more features from the foreground and the background to recognize the image.

17. The tangible machine readable medium of claim 16, wherein the features comprises one from a group comprising a foreground area, coordinates of a foreground centeroid, a foreground symmetry, a connected property, a spatial moment of the foreground, a normalized center moment of the foreground, a background area, variations of the background in red, green and blue color channels, a ratio of the foreground area and the background.

18. The tangible machine readable medium of claim 15, wherein the machine readable medium further comprising instructions that in response to being executed result in the computing device
   detecting a contour of the image to provide an edge image; and
   extracting a global edge density of the edge image and a local edge density of a image grid of the edge image.

* * * * *